(12) United States Patent
Loccufier

(10) Patent No.: US 11,254,831 B2
(45) Date of Patent: Feb. 22, 2022

(54) ENCAPSULATED OLIGOMERIC BLOCKED ISOCYANATES

(71) Applicant: AGFA NV, Mortsel (BE)

(72) Inventor: Johan Loccufier, Mortsel (BE)

(73) Assignee: AGFA NV, Mortsel (BE)

( * ) Notice: Subject to any disclaimer, the term of this patent is extended or adjusted under 35 U.S.C. 154(b) by 387 days.

(21) Appl. No.: 16/479,995

(22) PCT Filed: Jan. 22, 2018

(86) PCT No.: PCT/EP2018/051460
§ 371 (c)(1),
(2) Date: Jul. 23, 2019

(87) PCT Pub. No.: WO2018/138054
PCT Pub. Date: Aug. 2, 2018

(65) Prior Publication Data
US 2019/0367762 A1    Dec. 5, 2019

(51) Int. Cl.
| | |
|---|---|
| *D06M 15/568* | (2006.01) |
| *D06M 15/572* | (2006.01) |
| *C09D 11/033* | (2014.01) |
| *C09D 11/54* | (2014.01) |
| *D06P 5/02* | (2006.01) |
| *B41M 7/00* | (2006.01) |
| *B01J 13/16* | (2006.01) |
| *B41M 5/00* | (2006.01) |
| *C09D 11/037* | (2014.01) |
| *C09D 11/102* | (2014.01) |
| *C09D 11/322* | (2014.01) |
| *C09D 11/38* | (2014.01) |
| *C09D 11/40* | (2014.01) |
| *D06P 5/00* | (2006.01) |
| *D06P 5/30* | (2006.01) |

(52) U.S. Cl.
CPC ............. *C09D 11/54* (2013.01); *B01J 13/16* (2013.01); *B41M 5/0017* (2013.01); *B41M 5/0023* (2013.01); *B41M 5/0047* (2013.01); *B41M 7/009* (2013.01); *C09D 11/033* (2013.01); *C09D 11/037* (2013.01); *C09D 11/102* (2013.01); *C09D 11/322* (2013.01); *C09D 11/38* (2013.01); *C09D 11/40* (2013.01); *D06P 5/002* (2013.01); *D06P 5/30* (2013.01)

(58) Field of Classification Search
CPC ..... C09D 11/54; C09D 11/033; C09D 11/037; C09D 11/102; C09D 11/322; C09D 11/38; C09D 11/40; C09D 11/30; B01J 13/16; B41M 5/0017; B41M 5/0023; B41M 5/0047; B41M 7/009; D06P 5/002; D06P 5/30; D06P 1/5264; D06P 1/5271; D06P 1/54; D06P 1/607; D06M 15/068; D06M 15/072
See application file for complete search history.

(56) References Cited

U.S. PATENT DOCUMENTS

| | | | |
|---|---|---|---|
| 6,437,077 B1 * | 8/2002 | Danner ............... | C08G 18/283 528/73 |
| 9,920,211 B2 * | 3/2018 | Loccufier ........... | C09B 67/0097 |
| 10,907,064 B2 * | 2/2021 | Loccufier ............ | C09D 11/101 |
| 2009/0226678 A1 | 9/2009 | Yatake et al. | |
| 2012/0306976 A1 | 12/2012 | Kitagawa et al. | |
| 2019/0367760 A1 * | 12/2019 | Loccufier .............. | C09D 11/54 |
| 2019/0367761 A1 * | 12/2019 | Loccufier ............ | C09D 11/033 |

FOREIGN PATENT DOCUMENTS

| | | |
|---|---|---|
| EP | 2 933 374 A1 | 10/2015 |
| EP | 3 081 607 A1 | 10/2016 |
| WO | 03/029362 A1 | 4/2003 |
| WO | 2005/083017 A1 | 9/2005 |
| WO | 2009/137753 A1 | 11/2009 |
| WO | 2015/158649 A1 | 10/2015 |

OTHER PUBLICATIONS

Official Communication issued in International Patent Application No. PCT/EP2018/051460, dated Mar. 15, 2018.

* cited by examiner

*Primary Examiner* — Huan H Tran
(74) *Attorney, Agent, or Firm* — Leydig, Voit & Mayer, Ltd.

(57) ABSTRACT

An aqueous dispersion of a capsule is composed of a polymeric shell surrounding a core, the core containing an oligomeric blocked isocyanate characterized in that the blocked isocyanate is derived from a di-, tri- or tetrafunctional isocyanate terminated oligomer selected from the group of an isocyanate terminated oligo-ether, an isocyanate terminated oligo-ester, an isocyanate terminated oligo-carbonate, an isocyanate terminated butadiene oligomer, an isocyanate terminated hydrogenated butadiene, an isocyanate terminated isoprene oligomer, an isocyanate terminated silicone and combinations thereof. The dispersion is suitable for pre-treatment liquids and inkjet inks in textile printing.

20 Claims, No Drawings

US 11,254,831 B2

ENCAPSULATED OLIGOMERIC BLOCKED ISOCYANATES

CROSS REFERENCE TO RELATED APPLICATIONS

This application is a 371 National Stage Application of PCT/EP2018/051460, filed Jan. 22, 2018. This application claims the benefit of European Application No. 17152872.2, filed Jan. 24, 2017, which is incorporated by reference herein in its entirety.

BACKGROUND OF THE INVENTION

1. Field of the Invention

The present invention relates to encapsulated oligomeric blocked isocyanates as reactive binding chemistry for pigment inks for digital textile printing and inkjet ink formulations comprising them.

2. Description of the Related Art

In textile printing, there is a clear evolution from classical textile printing technologies such as screen printing towards digital printing. Additionally, there is a tendency to go from dye based inks to pigment based inks. Pigment based inks hold the promise of being compatible with different fibres, both natural fibres such as cellulose base fibres e.g. in cotton and synthetic fibres such as polyester and polyamide. Pigment based inks also allow to print on mixed fibre fabrics.

To bind the pigments to the different types of fibre, reactive binder technology has to be introduced into the inks. Several approaches have been disclosed in the patent literature.

WO2003/029362 discloses an ink composition comprising at least one pigment, at least one dispersed resin selected from the group consisting of acrylic acrylonitrile resins, styrene-acrylic resins, acrylic-butadiene resins, butadiene acrylonitrile resins and polyurethane resins, at least one crosslinker and a liquid medium. Melamine resins are disclosed as particularly preferred resins.

WO2005/083017 discloses an ink for textile printing comprising specific wetting agents for spreading control. The inks comprise a polyurethane as pigment dispersing agent in combination with a melamine as fixing agent.

WO2009/137753 discloses an ink composition comprising a colorant, a specific crosslinked polyurethane designed for hydrolytical stability and a post curing agent selected from the group consisting of amide and amine formaldehyde resins, phenolic resins, urea resins and blocked isocyanates, with melamine formaldehyde resins as preferred embodiment.

U.S. Pat. No. 5,853,861 discloses an ink textile combination, where the ink comprises at least on pigment and a polymer having a functional group selected from an acid, a base, an epoxy and a hydroxyl group and where the textile comprises at least one specific functional group selected from the group consisting of a hydroxyl, an amine, an amide and a carbonyl moiety and a crosslinker selected from specific organometallic compounds and isocyanates.

US2009/0226678 discloses an ink set comprising a fixing liquid and an ink comprising a pigment dispersion. The fixing agent comprises specific polymer particles with a Tg below −10° C. and a reactant, preferably a blocked isocyanate dispersion.

US2012/0306976 discloses an ink comprising a pigment, a dispersing agent for said pigment, typically an acrylate based resin, a water soluble fixing agent, typically a water soluble polymer such as a poly(vinyl alcohol) derivative or a polyurethane based resin and a crosslinking agent, preferably a blocked isocyanate, where said crosslinker is capable of crosslinking said dispersant and said polymer fixing agent upon thermal treatment at a temperature of at least 100° C.

EP 2933374 discloses the use of encapsulated reactive chemistry in pigment containing aqueous inkjet inks, to manufacture printed textiles. Blocked isocyanates are disclosed as preferred reactive chemistry. These blocked isocyanates are multifunctional low molecular weight blocked isocyanates, automatically leading high crosslinking degrees significantly limiting the scope of obtainable physical properties and as a consequence limiting the number of applications. Furthermore, bringing two colloidal systems, one based on a dispersed colour pigment and one based on a dispersed capsule into one aqueous ink formulation does limit the colloidal stability of at least one colloid system, leading to a reduced shelf life of the ink.

As printed textiles are applied in different areas going from apparel, over home decoration to technical textile, a broad scope of physical properties of the printed image, such as soft touch, high crock fastness while maintaining flexibility, chemical resistance towards solvents and dry clean resistance have to be fulfilled. Depending on the application, a specific combination of these demands have to be fulfilled at the same time.

Therefore, there is a need for an approach that allows to tune the properties of the printed image after thermal fixation towards the demand of different textile applications and further extending the colloidal stability of the pigmented aqueous inkjet ink.

SUMMARY OF THE INVENTION

Preferred embodiments of the present invention provide a solution to the above stated problems by providing a dispersion of encapsulated oligomeric blocked isocyanates as binding chemistry for water based liquids as defined below.

It is further an object of the present invention to provide an inkjet ink comprising encapsulated oligomeric blocked isocyanates as defined below.

It is another embodiment of the invention to provide a printing method using inkjet inks comprising encapsulated oligomeric blocked isocyanates.

Other features, elements, steps, characteristics and advantages of the present invention will become more apparent from the following detailed description of preferred embodiments of the present invention. Specific embodiments of the invention are also defined in the dependent claims.

DETAILED DESCRIPTION OF THE PREFERRED EMBODIMENTS

A. Nanocapsules
A.1. Oligomeric Blocked Isocyanates

The synthesis of blocked isocyanates is well-known to the skilled person and has been reviewed by Wicks D. A. and Wicks Z. W. Jr. (Progress in Organic Coatings, 36, 148-172 (1999)) and Delebecq et al. (Chem; Rev., 113, 80-118 (2013)). Classic blocked isocyanates are defined as chemical components that are capable of forming isocyanates from a precursor upon thermal treatment. In general, the reaction can be summarized as given in scheme 1 below.

Scheme 1:

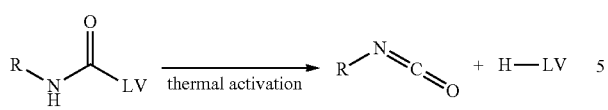

LV Represents a Leaving Group

The activation temperature, also called deblocking temperature, is dependent on the leaving group and is selected dependent on the application. Suitable isocyanate precursors are given below having a variable deblocking temperature between 100° C. and 180° C.

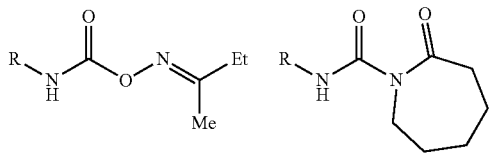

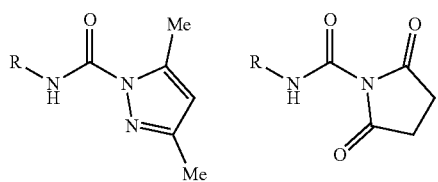

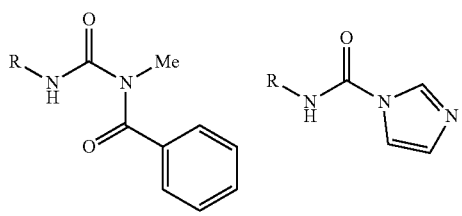

Active methylene compounds as blocking agents are widely used as alternatives for classic blocked isocyanates, operating via an alternative reaction pathway, not yielding an intermediate isocyanate but crosslinking the system via ester formation as disclosed in Progress in Organic Coatings, 36, 148-172 (1999), paragraph 3.8. Suitable examples of active methylene group blocked isocyanates are given below:

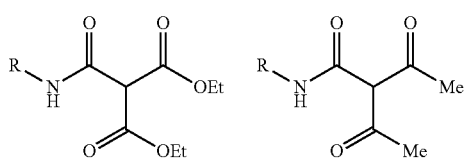

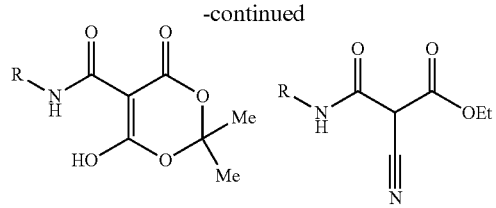

In a preferred embodiment, said oligomeric blocked isocyanate according to the present invention has a number average molecular weight of 5000 or less, more preferably less than 4000 and most preferably less than 3000.

In a preferred embodiment, the blocking group is selected from the group consisting of a malonate group, a pyrazole group and a caprolactam group, a malonate group being particularly preferred.

In the most preferred embodiment, said blocked isocyanate has a structure according to General Structure I.

General Structure I

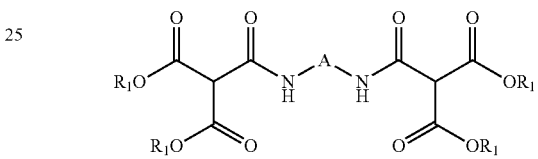

wherein $R_1$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group.

A represents a difunctional oligomeric group selected from the group consisting of an oligo-ether, an oligo-ester, an oligo-carbonate, a butadiene oligomer, a hydrogenated butadiene oligomer, an isoprene oligomer, a silicone oligomer and combinations thereof.

In an even more preferred embodiment, $R_1$ represents an alkyl group, a C1 to C4 alkyl group being more preferred, an ethyl group being the most preferred.

In a preferred embodiment said poly-ether oligomers preferably contain 3 to 50 repeating units, more preferably 5 to 40 repeating units and most preferably 6 to 30 repeating units. Said poly-ester based oligomer preferably contains 2 to 20 repeating units, more preferably 3 to 15 repeating units and most preferably 4 to 10 repeating units. Said polysiloxane based oligomer preferably contains 3 to 40 repeating units, more preferably 5 to 30 repeating units and most preferably 6 to 20 repeating units. Said polycarbonate based oligomer preferably contains 3 to 30 repeating units, more preferably 4 to 20 repeating units and most preferably 5 to 15 repeating units. Said polybutadiene, hydrogenated polybutadiene and polyisoprene based oligomers preferably contain 3 to 50 repeating units, 5 to 40 repeating units and most preferably 6 to 30 repeating units. Oligomers containing different oligomeric repeating units preferably contain 60 repeating units or less, more preferably 50 repeating units or lees and most preferably 30 repeating units or less.

Typical examples of oligomeric blocked isocyanates according to the present invention are given below without being limited thereto.

TABLE 1

TABLE 1-continued
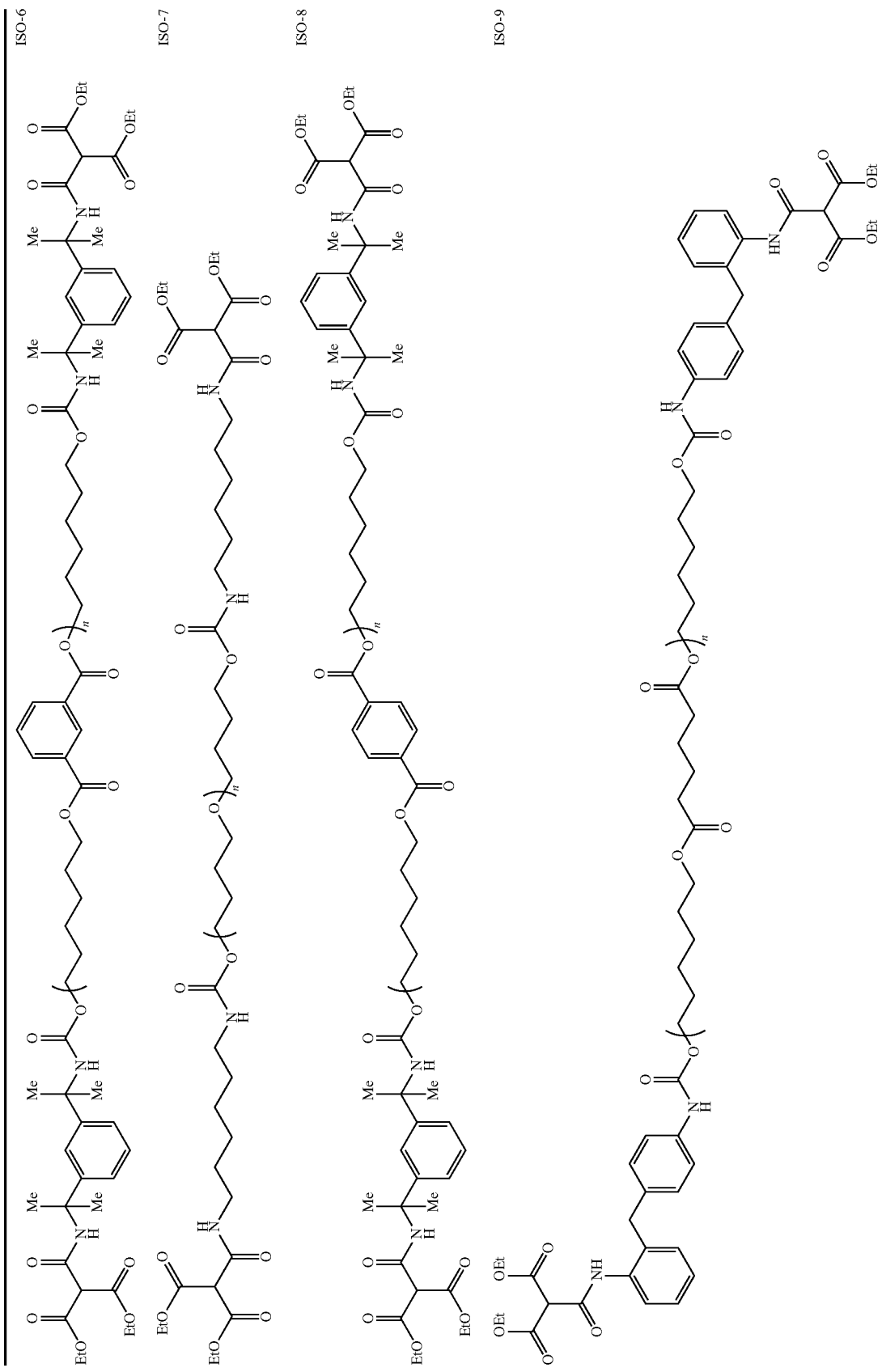

TABLE 1-continued

| ISO-9 | ISO-10 | ISO-11 | ISO-12 |

A.2. Encapsulation Technologies

The nanocapsules according to the invention are made by an encapsulation process to encapsulate the oligomeric blocked isocyanates.

Encapsulation is a process in which tiny particles or droplets are surrounded by a shell to give small capsules. The material inside the capsule is referred to as the core or the internal phase, whereas the shell is sometimes called a wall. This technology has been applied in different technical fields, such as self healing compositions (Blaiszik et al., Annual Review of Materials, 40, 179-211 (2010)), textile treatment (Marinkovic et al., CI&CEQ 12(1), 58-62 (2006); Nelson G., International Journal of Pharmaceutics, 242, 55-62 (2002), Teixeira et al., AIChE Journal, 58(6), 1939-1950 (2012)), thermal energy storage and release for buildings (Tyagi et al., Renewable and Sustainable Energy Reviews, 15, 1373-1391 (2011)), printing and recording technology (Microspheres, Microcapsules and Liposomes: Volume 1: Preparation and Chemical Applications, editor R. Arshady, 391-417 and ibid., 420-438, Citus Books, London, 1999), personal care, pharmaceuticals, nutrition, agrochemicals (Lidert Z., Delivery System Handbook for Personal Care and Cosmetic Products, 181-190, Meyer R. Rosen (ed.), William Andrew, Inc. 2005; Schrooyen et al., Proceedings of the Nutrition Society, 60, 475-479 (2001)) and electronic applications (Yoshizawa H., KONA, 22, 23-31 (2004)).

Microcapsules can be prepared using both chemical and physical methods. Encapsulation methodologies include complex coacervation, liposome formation, spray drying and precipitation and polymerisation methods. For technological applications, interfacial polymerisation is a particularly preferred technology, which has recently been reviewed by Zhang Y. and Rochefort D. (Journal of Microencapsulation, 29(7), 636-649 (2012) and by Salaün F. (in Encapsulation Nanotechnologies, Vikas Mittal (ed.), chapter 5, 137-173 (Scrivener Publishing LLC (2013)).

In the present invention preferably a polymerization method is used, as it allows the highest control in designing the capsules. More preferably interfacial polymerization is used to prepare the capsules used in the invention. This technique is well-known and has recently been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

Interfacial polymerisation is a particularly preferred technology for the preparation of capsules according to the present invention. In interfacial polymerization, such as interfacial polycondensation, two reactants meet at the interface of the emulsion droplets and react rapidly.

In general, interfacial polymerisation requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerisation, a polymer is formed that is insoluble in both the aqueous and the olephilic phase. As a result, the formed polymer has a tendency to precipitate at the interface of the oleophilic and aqueous phase, hereby forming a shell around the dispersed phase, which grows upon further polymerisation. The capsules according to the present invention are preferably prepared from an oleophilic dispersion in an aqueous continuous phase.

A.3. Polymeric Shell

Typical polymeric shells of the capsules according to the invention and formed by interfacial polymerisation are selected from the group consisting of polyamides, typically prepared from di- or oligoamines as first shell component and di- or poly-acid chlorides as second shell component, polyurea, typically prepared from di- or oligoamines as first shell component and di- or oligoisocyanates as second shell component, polyurethanes, typically prepared from di- or oligoalcohols as first shell component and di- or oligoisocyanates as second shell component, polysulfonamides, typically prepared from di- or oligoamines as first shell component and di- or oligosulfochlorides as second shell component, polyesters, typically prepared from di- or oligoalcohols as first shell component and di- or oligo-acid chlorides as second shell component and polycarbonates, typically prepared from di- or oligoalcohols as first shell component and di- or oligo-chloroformates as second shell component. The shell can be composed of combinations of these polymers.

In a further embodiment, polymers, such as gelatine, chitosan, albumin and polyethylene imine can be used as first shell components in combination with a di- or oligoisocyanate, a di- or oligo acid chloride, a di- or oligo-chloroformate and an epoxy resin as second shell component.

In a particularly preferred embodiment, the shell is composed of a polyurethane, a polyurea or a combination thereof. In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent.

In the most preferred embodiment, the capsules are self dispersing capsules. In order to make capsules self-dispersing, anionic dispersing groups, such as carboxylic acids or salts thereof, or cationic dispersing groups have to be coupled covalently to the polymeric shell of the capsule to guarantee the dispersion stability.

A preferred strategy to incorporate anionic stabilizing groups into the polymeric shell of a nanocapsule makes use of carboxylic acid functionalized reactive surfactants that are capable of reacting with isocyanates. This leads to an amphoteric type of surfactant containing at least partially secondary or primary amines. Other reactive surfactants functionalized with a sulfonic acid or salt thereof, a phosphoric acid ester or a salt thereof or a phosphoric acid or salt thereof can be used.

Several amphoteric surfactants, being mixtures of surfactants partially having secondary amines but also comprising tertiary amines are commercially available. Prohibitive foam formation in ink jet inks based on nanocapsules made by using the commercially available amphoteric surfactants was encountered in an inkjet printer. Foaming caused problems in the ink supply and also in the degassing for trying to remove air from the ink, thus leading to unreliable jetting. Therefore, surfactants according to Formula (I) of WO2016/165970 are preferably used during the encapsulation process of the oligomeric blocked isocyanates.

Another preferred strategy to incorporate cationic stabilizing groups into the polymeric shell of a nanocapsule makes use of coupling a surfactant with a cationic dispersing group to the shell of the nanocapsules according to the present invention by reaction of a surfactant comprising at least one primary or secondary amine group and at least a group selected from protonated amine, a protonated nitrogen containing heteroaromatic compound, a quaternized tertiary amine, a N-quaternized heteroaromatic compound, a sulfonium and a phosphonium with an isocyanate monomer of the shell. In an even more preferred embodiment said surfactant is a surfactant according to General Formula II General Formula II

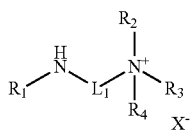

wherein $R_1$ is selected from the group consisting of a substituted or unsubstituted alkyl group, a substituted or unsubstituted alkenyl group and a substituted or unsubstituted alkynyl group with the proviso that $R_1$ comprises at least eight carbon atoms; $R_2$, $R_3$ and $R_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group $L_1$ represents a divalent linking group comprising no more than eight carbon atoms;

X represents a counterion to compensate the positive charge of the ammonium group.

The capsules have an average particle size of no more than 4 μm as determined by dynamic laser diffraction. The nozzle diameter of inkjet print heads is usually 20 to 35 μm. Reliable inkjet printing is possible if the average particle size of the capsules is five times smaller than the nozzle diameter. An average particle size of no more than 4 μm allows jetting by print heads having the smallest nozzle diameter of 20 μm. In a more preferred embodiment, the average particle size of the capsules is ten times smaller than the nozzle diameter. Hence preferably, the average particle size is from 0.05 to 2 μm, more preferably from 0.10 to 1 μm. When the average particle size of the capsule is smaller than 2 μm, excellent resolution and dispersion stability with time are obtained.

In a further embodiment, the aqueous medium of the dispersion of the present invention may further comprise a catalyst to activate said thermally reactive chemistry. The catalyst is preferably selected from the group consisting of a Brönsted acid, a Lewis acid and thermal acid generator. Said catalyst can be present in the aqueous continuous phase, in the core of the capsule or in a separate dispersed phase.

A.4. Solvent

The capsules according to the invention are dispersed into an aqueous medium. The aqueous medium consists of water, but may preferably include one or more water-soluble organic solvents.

The one or more organic solvents may be added for a variety of reasons. For example, it can be advantageous to add a small amount of an organic solvent to improve the dissolution of a compound in the pre-treatment liquid or inkjet ink to be prepared. Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-prapanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino) ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'thiodiethanol, amides (e.g., N,N-dimethylformamide), heterocycles (e.g., 2-pyrrolidone and N-methyl-2-pyrrolidone), and acetonitrile.

B. Aqueous Formulations Comprising the Dispersion of Encapsulated Oligomeric Blocked Isocyanates.

B.1. Pre-Treatment Liquid for Textile Printing

Aqueous pre-treatment liquids for treating textile fabrics before printing aqueous colorant containing inks onto the fabric may comprise the dispersion of encapsulated oligomeric blocked isocyanates of the invention. The aqueous medium contains water, but may include one or more water-soluble organic solvents. Suitable organic solvents are described in § A.4. If present in the pre-treatment liquid, then the nanocapsules are preferably in an amount of no more than 30 wt. %, preferably between 5 and 25 wt. % based on the total weight of the ink. From the encapsulated oligomeric blocked isocyanates, the ones having a polymeric shell comprising cationic dispersing groups are particularly preferred.

The pre-treatment liquid may also contain humectants. Humectants are preferably incorporated in the pre-treatment liquid if this liquid has to be applied by means of a jetting technique such as inkjet or valve jet. Humectants prevent the clogging of nozzles. The prevention is due to its ability to slow down the evaporation rate of the pre-treatment liquid, especially the water in the liquid. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The humectant is preferably added to the liquid formulation in an amount of 0.1 to 20 wt. % based on the total weight of the liquid.

A multivalent metal ion can be contained in the pre-treatment liquid as a flocculant. Suitable examples are water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3^-$), and an acetate ion ($CH_3COO^-$).

These polyvalent metal ions have a function of aggregating ink by acting on the carboxyl groups on the surface of the pigment in the ink jet ink, or on the dispersed polymer of nanocapsules contained in the ink. As a result, the ink remains on the surface of the textile fabric to improve the colour-developing property. Therefore, it is preferred that the surface of the pigment in the ink and/or the dispersed polymer of the nanocapsules contained in the ink have a carboxyl group.

The pre-treatment may also contain organic acids as a flocculant. Preferred examples of the organic acids include, but are not limited to, acetic acid, propionic acid, and lactic acid.

The pre-treatment liquid may further contain a resin emulsion as a flocculant. Examples of the resin include, but are not limited to, starches derived from, for instance, maize and wheat; cellulosic materials such as carboxymethyl cellulose and hydroxymethyl cellulose; polysaccharide such as sodium alginate, gum arabic, locust bean gum, trant gum, guar gum, and tamarindus indica seed; proteins such as gelatine and casein; water-soluble naturally occurring polymers such as tannin and lignin; and synthetic water-soluble polymers such as polymers comprising polyvinyl alcohol, polymers comprising polyethylene oxide, polymers formed from acrylic acid monomers, and polymers formed from maleic anhydride monomers. Very suitable resins are acrylic polymers as described in EP2362014 [0027-0030]. The resin content is preferably not more than 20 wt. % relative to the total mass of the pre-treatment liquid (100 mass %).

The pre-treatment liquid may contain a surfactant. Any known surfactant may be used but preferably a glycol surfactant and/or an acetylene alcohol surfactant. The use of the acetylene glycol surfactant and/or the acetylene alcohol surfactant further reduces bleeding to improve printing quality, and also improves the drying property in printing to allow high-speed printing.

The acetylene glycol surfactant and/or the acetylene alcohol surfactant is preferably one or more selected from 2, 4, 7, 9-tetramethyl-5-decine-4, 7-diol, alkylene oxide adducts of 2,4,7,9-tetramethyl-5-decine-4, 7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine E1 010, or from Nissin Chemical Industry as Surfynol (registered trademark) 465 and Surfynol 61.

The pre-treatment liquid may also contain pigments. Particularly useful for printing on dark textile is a pre-treatment liquid containing a white pigment. The preferred pigment for the aqueous pre-treatment liquid ink is titanium dioxide. Titanium dioxide ($TIO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully setforth.

The titanium dioxide particles can have a wide variety of average particle sizes of about 1 micron or less, depending on the desired end use application of the pre-treatment liquid. For applications demanding high hiding or decorative printing applications, the titanium dioxide particles preferably have an average size of less than about 1 µm. Preferably, the particles have an average size of from about 50 to about 950 nm, more preferably from about 75 to about 750 nm, and still more preferably from about 100 to about 500 nm.

For applications demanding white colour with some degree of transparency, the pigment preference is "nano" titanium dioxide. "Nano" titanium dioxide particles typically have an average size ranging from about 10 to about 200 nm, preferably from about 20 to about 150 nm, and more preferably from about 35 to about 75 nm. An ink comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

In addition, unique advantages may be realized with multiple particle sizes, such as opaqueness and UV protection. These multiple sizes can be achieved by adding both a pigmentary and a nano grade of $TIO_2$.

The titanium dioxide is preferably incorporated into the pre-treatment formulation via a slurry concentrate composition. The amount of titanium dioxide present in the slurry composition is preferably from about 15 wt. % to about 80 wt. %, based on the total slurry weight.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photo-reactivity of the titanium dioxide. Metal oxide coatings of alumina, aluminasilica, boria and zirconia result in a positive charged surface of the $TiO_2$ pigments and hence are particularly useful in combination with the cationic stabilised capsules of the invention because no additional surface treatment of the pigment is required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan).

A biocide may be added to the pre-treatment liquid to prevent unwanted microbial growth, which may occur in the liquid. The biocide may be used either singly or in combination. Suitable biocides for the ink-jet ink of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added to the aqueous medium in an amount of 0.001 to 3 wt. %, more preferably 0.01 to 1.0 wt. %, each based on the ink liquid.

The pre-treatment liquid may further comprise at least one thickener for viscosity regulation in the liquid. Suitable thickeners include urea or urea derivatives, hydroxyethylcellulose, carboxymethylcellulose, hydroxypropylcellulose, derived chitin, derived starch, carrageenan, pullulan, proteins, poly(styrenesulphonic acid), poly(styrene-co-maleic anhydride), poly(alkyl vinyl ether-co-maleic anhydride), polyacrylamid, partially hydrolyzed polyacrylamid, poly(acrylic acid), poly(vinyl alcohol), partially hydrolyzed poly(vinyl acetate), poly(hydroxyethyl acrylate), poly(methyl vinyl ether), polyvinylpyrrolidone, poly(2-vinylpyridine), poly(4-vinylpyridine) and poly(diallyldimethylammonium chloride).

The thickener is added preferably in an amount of 0.01 to 20 wt. %, more preferably 0.1 to 10 wt. % based on the liquid.

The pre-treatment liquid may contain at least one pH adjuster. Suitable pH adjusters include organic amines, NaOH, KOH, $NEt_3$, $NH_3$, HCl, $HNO_3$ and $H_2SO_4$. In a preferred embodiment, the pre-treatment liquid has a pH lower than 7. A pH of 7 or less can advantageously influence the electrostatic stabilization of the capsules, especially when the dispersing groups of the nanocaps are amines.

The pre-treatment liquid may also contain an optothermal converting agent, which may be any suitable compound absorbing in the wavelength range of emission by an infrared light source. The optothermal converting agent is preferably an infrared dye as this allows easy handling into the inkjet ink. The infrared dye may be included into the aqueous medium, but is preferably included in the core of the capsule. In the latter, the heat transfer is usually much more effective.

Suitable examples of infrared dyes are disclosed in [0179] of WO2015158649. The one or more optothermal converting agents are preferably present in the range of 0.1 to 10 wt. % based on the total weight of the pre-treatment liquid.

B.2. Inkjet ink.

The dispersion comprising the nanocaps of the invention is also suitable to be incorporated in aqueous ink jet inks containing a pigment. The nanocapsules are preferably present in the inkjet ink in an amount of no more than 30 wt. %, preferably between 5 and 25 wt. % based on the total weight of the ink.

B.2.1. Solvent

The aqueous medium of the ink contains water, but may preferably include one or more water-soluble organic solvents. Suitable solvents are described in § A.4.

B.2.2. Pigments

The pigments of the ink may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments are disclosed in paragraphs [0128] to [0138] of WO 2008/074548.

The pigment particles are dispersed in an aqueous medium using a polymeric dispersant, an anionic surfactant, but preferably a self-dispersible pigment is used. The latter prevents interaction of the polymeric dispersant with the dispersing groups of capsules which may be included in the inkjet ink (see below), since dispersion stability of the pigment is accomplished by the same technique of electrostatic stabilization as employed for the capsules.

A self-dispersible pigment is a pigment having on its surface covalently bonded anionic hydrophilic groups, such as salt-forming groups or the same groups used as dispersing groups for the capsules, that allow the pigment to be dispersed in an aqueous medium without using a surfactant or a resin.

The technology for making self-dispersible pigments is well-known. For example, EP1220879 A discloses pigments having attached a) at least one steric group and b) at least one organic ionic group and at least one amphiphilic counterion, wherein the amphiphilic counterion has a charge opposite to that of the organic ionic group that are suitable for inkjet inks. Also EP906371A discloses suitable surface-modified coloured pigment having attached hydrophilic organic groups containing one or more ionic groups or ionizable groups. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function.

However for white pigment inkjet inks, the numeric average particle diameter of the white pigment is the same as described in § B.1.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

Also special colorants may be used, such as fluorescent pigments for special effects in clothing, and metallic pigments for printing a luxury look of silver and gold colours on textiles.

Suitable polymeric dispersants for the pigments are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOL-SPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

B.2.3. Resin

The ink jet ink composition according to the invention may further comprise a resin. The resin is often added to the ink jet ink formulation to achieve a good adhesion of the pigment to the fibres of the textile fabric. The resin is a polymer and suitable resins can be acrylic based resins, a urethane-modified polyester resin or a polyethylene wax.

The polyurethane resin is to be incorporated in the ink formulation as a dispersion and may be selected from the group consisting of aliphatic polyurethane dispersions, aromatic polyurethane dispersions, anionic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, for example, or a combination of two or more of the above.

A preferred urethane resin to be used as dispersion in the ink of the invention is a polyester resin including a structural unit containing a urethane bond. Among such resins, a water-soluble or water-dispersible urethane-modified polyester resin is preferred. It is preferable that the urethane-modified polyester resin include at least one structural unit derived from a hydroxyl group-containing polyester resin (polyester polyol) and at least one structural unit derived from an organic polyisocyanate.

Furthermore, the hydroxyl group-containing polyester resin is a resin formed by an esterification reaction or transesterification reaction between at least one polybasic acid component and at least one polyhydric alcohol component.

A preferred polyurethane resin to be included in the ink of the invention is a polyurethane resin obtainable by reacting a polyester polyol, a polyether diol, a polyol containing an anionic group and a polyisocyanate. A particular preferred polyurethane resin is a polyurethane resin obtainable by reacting a polyester polyol, a polyether diol, a polyol containing an anionic group and a polyisocyanate, and wherein the polyester polyol is obtained by reacting an aromatic polycarboxylic acid and a polyol. Examples of suitable polyurethane resins and their preparations are disclosed in the unpublished patent application EP16196224.6.

Some examples of suitable polyurethane dispersions are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim Calif.); and SANCURE 2715, SANCURE 20041, SANCURE 2725 (Lubrizol Corporation), for example, or a combination of two or more of the above.

Acrylic based resins include polymers of acrylic monomers, polymers of methacrylic monomers, and copolymers of the aforementioned monomers with other monomers. These resins are present as a suspension of particles having an average diameter of about 30 nm to about 300 nm. The acrylic latex polymer is formed from acrylic monomers or methacrylic monomer residues. Examples of monomers of the acrylic latex polymer include, by way of illustration, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene.

Some examples of suitable acrylic latex polymer suspensions are, JONCRYL 537 and JONCRYL 538 (BASF Corporation, Port ArthurTX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation); NEOCRYL A-1110, NEOCRYL A-1131, NEOCRYL A-2091, NEOCRYL A-1127, NEOCRYL XK-96, and NEOCRYL XK-14 (DSM); and BAYHYDROL AH XP 2754, BAYHYDROL AH XP 2741, BAYHYDROL A 2427, and BAYHYDROL A2651 (Bayer), for example, or a combination of two or more of the above.

The concentration of the resin in the ink jet ink according to the invention is at least 1 (wt.)% and preferably lower than 30 (wt.)%, more preferably lower than 20 (wt.)%.

B.2.3. Additives

The aqueous inkjet ink may further comprise a surfactant, a humectant, a biocide and a thickener as an additive. These suitable additives are described in § B.1.

C. Inkjet Printing Method

Printing methods using liquids such a pre-treatment liquids for textile printing or aqueous inkjet inks for colour printing on a substrate and includes at least the steps of: a) applying the liquid comprising the dispersion of the capsules according to the invention onto a substrate; and b) applying heat to activate the oligomeric blocked isocyanates in the capsule.

In a digital textile printing process of the invention, the textile fabric used is made of one type of fibre or blended fibre of two or more selected from the group consisting of cotton, hemp, rayon fibre, acetate fibre, silk, nylon fibre, and polyester fibre. The fabric may be in any form, for example, a woven, knitted, or nonwoven form of the above-mentioned fibres.

In a first step of the digital textile printing method, a pre-treatment liquid containing a flocculant is preferably applied to the fabric by spraying, coating, or pad printing. Alternatively, the pre-treatment liquid may also be applied to fabric using an ink jet head or valve jet head. These last means of applying the pre-treatment liquid has the advantage that the amount of required pre-treatment liquid is substantially lower than with the other application methods. By means of an ink jet head, it is possible to apply the pre-treatment liquid onto areas of the fabric where the image should be printed.

Preferably the pre-treatment liquid comprises the dispersion of nanocapsules according to the invention. More preferably, the nanocapsules wherein the polymeric shell contains cationic dispersing groups is to be used in the pre-treatment liquid. When the pre-treatment agent is applied to fabric with an ink jet head, the particle diameter of the nanocapsules is preferably in the range 50 nm to 1 μm when determined by light scattering. A particle diameter larger than 1 μm tends to cause a deterioration in stability of jetting from the ink jet head. The particle diameter is more preferably 500 nm or less. Suitable ink jet head types for applying the pre-treatment liquid are piezoelectric type, continuous type, thermal print head type or valve jet type.

Preferable capsules are the one with a core comprising a thermally reactive crosslinker and stabilised with cationic dispersing groups.

Fabric to which the pre-treatment liquid has been applied may be dried and optionally undergo a heat treatment, before the subsequent ink jetting step with colorant containing ink. The heat treatment is preferably at 110 to 200° C., more preferably 130 to 160° C. Heating at 110° C. or higher enables the thermally reactive crosslinker in the core of the nanoparticle to be fixed to the fibres of the fabric. Examples of the heating process include, but are not limited to, heat press, atmospheric steaming, high-pressure steaming, and THERMOFIX. Any heat source can be used for the heating process; for example, an infrared ray lamp is employed.

After the application of the pre-treatment liquid of the textile fabric, a coloured image may be jetted by means of an aqueous inkjet ink containing a pigment. Preferably the inkjet ink may further comprise the dispersion of the nanocapsules according to the invention.

After the ink jetting step, the printed fabric is dried and heated. If the heating step after the pre-treatment did not occur (see above), the heating step of the printed fabric is required. The drying step can be performed at the air, but the heating step must be performed by using heat sources; examples include equipment for forced-air heating, radiation heating such as IR-radiation, including NIR- and CIR radiation, conduction heating, high-frequency drying, and microwave drying. The drying step of the fabric is carried at a temperature preferably below 150° C., more preferably below 100° C., most preferably below 80° C. The heating step is preferably at 110 to 200° C., more preferably 130 to 160° C.

Another embodiment of the inkjet printing method according to the present invention includes at least the steps of: a) jetting an inkjet ink comprising a colorant and the dispersion of the nanocapsules of the invention onto a substrate; and b) applying heat to activate the oligomeric blocked isocyanates in the capsule. Suitable substrates are textile fabrics, leather, glass, ceramic, metallic, glass, wood, paper or polymeric surfaces. The substrate may also be primed, e.g. by a white ink.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 $g/cm^3$ or more.

A preferred ink jet head for the inkjet printing system is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the ink jet head. However the jetting of the ink according to the present invention is not restricted to piezoelectric inkjet printing. Other inkjet print heads can be used and include various types, such as a continuous type, a thermal print head type and a valve jet type.

If an optothermal converting agent is present in the nanocapsules of the invention, the heating mains may be a suitable light source. If the optothermal converting agent consists of one or more infrared dyes, an infrared light source is used. Any infrared light source may be used, as long as at least part of the emitted light is suitable for activating the thermally reactive crosslinker. The infrared curing means may include an infrared laser, an infrared laser diode, infrared LEDs or a combination thereof.

EXAMPLES

1. Materials

Lakeland ACP70 is a zwitterionic surfactant supplied by Lakeland Laboratories LTD.

Desmodur N75 BA is a trifunctional isocyanate supplied by Bayer AG.

Trixene BI7963 is a malonate blocked isocyanate supplied by Baxenden Chemicals LTD).

Alkanol XC is an anionic surfactant supplied by Dupont.

TDI terminated poly(propylene oxide) (Mn=2300, NCO-content: 3.6 w %) was supplied by Aldrich.

Desmodur XP2617 was supplied by Covestro.

Desmodur VPLS2371 was supplied by Covestro.

Polurcast PE95 A 01, Polurcast PET88 A 01 and Polurcast PET85 A 01 were supplied by Sapici.

Cab-o-Jet 465M is a magenta pigment dispersion supplied by Cabot

Cab-o-Jet 465C is a cyan pigment dispersion supplied by Cabot.

Cab-o-Jet 470Y is a yellow dispersion supplied by Cabot.

Cab-O-Jet 300 is a black dispersion supplied by Cabot.

Cab-O-Jet 740Y is a yellow dispersion supplied by Cabot.

Diamond D75C is a cyan dispersion supplied by Diamond Dispersions.

Diamond D75M is a magenta dispersion supplied by Diamond Dispersions.

Diamond D75Y is a yellow dispersion supplied by Diamond Dispersions.

Diamond D75K is a black dispersion supplied by Diamond Dispersions.

Diamond D71Y155 is a yellow dispersion supplied by Diamond Dispersions.

2. Measuring Methods 2.1. Average Particle Size

The average particle size was measured using a Zetasizer™ Nano-S (Malvern Instruments, Goffin Meyvis).

2.2. Touch and Feel

A touch and feel test was done, where both the inventive and comparative fabric sample were evaluated by a panel of five persons, scoring the touch and the feel from 0 to 5. 0 means that there is no difference noticeable between the unprinted fabric and the solid area. 5 means a very stiff feeling. The scores were averaged.

2.3. Stability

Ink stability was evaluated numerically and visually. If the relative viscosity of the ink increases more than 40% after being stored for 7 days at 60° C. the ink is called unstable. If the ink solidifies or if phase separation can be seen the ink is called unstable.

3. Synthesis of Nanocapsules of the Invention

3.1. The Synthesis of Co-Reactive Cationic Surfactants

Synthesis of CATSURF-1

CATSURF-1 was prepared according to the following reaction:

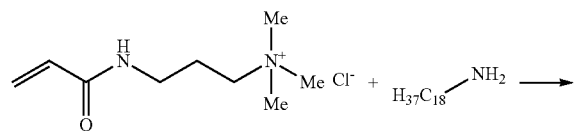
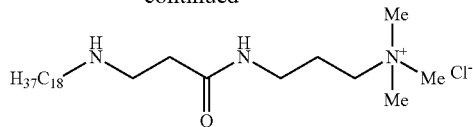

29 g (0.105 mol) (3-acrylamidopropyl)trimethylammonium chloride (supplied as 75 W % in water) is dissolved in 150 g isopropanol. 26.9 g (0.1 mol) octadecyl amine and 15 g (0.148 mol) triethyl amine were added and the mixture was heated to 80° C. for 24 hours. The solvent was removed under reduced pressure. CATSURF-1 was used in nanocapsule syntheses without further purification.

Synthesis of CATSURF-2

CATSURF-2 was prepared according to the following reaction:

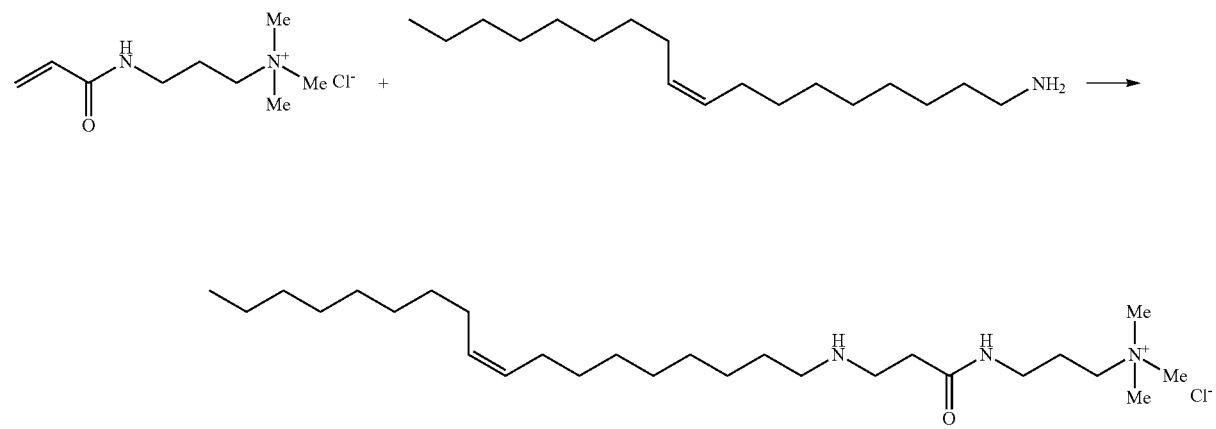

29 g (0.105 mol) (3-acrylamidopropyl)trimethylammonium chloride (supplied as 75 W % in water) is dissolved in 150 g isopropanol. 26.7 g (0.1 mol) oleyl amine and 15 g (0.148 mol) triethyl amine were added and the mixture was heated to 80° C. for 24 hours. The solvent was removed under reduced pressure. Surf-5 was used in nanocapsule syntheses as described below without further purification.

3.2. The Synthesis of Oligomeric Blocked Isocyanates

The Synthesis of a TDI Terminated Polypropylene Oxide Based Malonate Blocked Isocyanate (ISO-1)

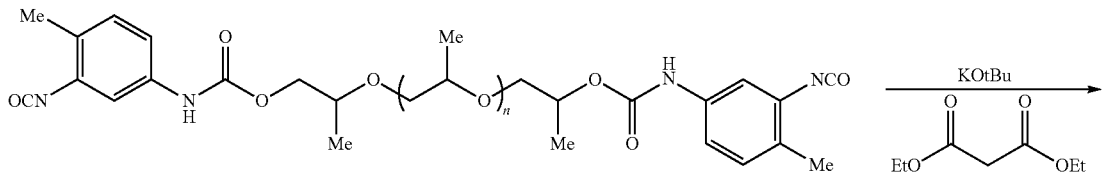

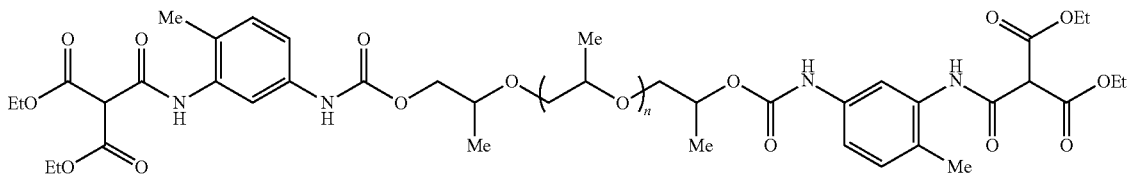

17.6 g (0.11 mol) diethyl malonate was dissolved in 450 ml THF. 12.3 g (0.11 mol) potassium tert. butoxide was added and the mixture was stirred for 30 minutes. Upon addition of the potassium tert. butoxide, the potassium salt of diethyl malonate precipitated from the medium. During the addition, the temperature rose to 40° C. The mixture was cooled to 20° C. and 115 g of TDI terminated poly(propylene oxide) (Mn=2300, NCO-content: 3.6 w %) was added. The reaction was allowed to continue for 16 hours at room temperature. The solvent was evaporated under reduced pressure and 300 ml methylene chloride was added. The methylene chloride solution was added to a solution of 11 g of concentrated hydrochloric acid in 500 ml water. The organic fraction was isolated and 200 ml of tert.butyl methyl ether was added. The organic fraction was extracted three times with 250 ml brine, dried over MgSO$_4$ and evaporated under reduced pressure. 129 g of the malonate endcapped polymer was isolated. The oligomeric blocked isocyanate was used without further purification.

The Synthesis of an HDI Terminated Polypropylene Oxide Based Malonate Blocked Isocyanate (ISO-13)

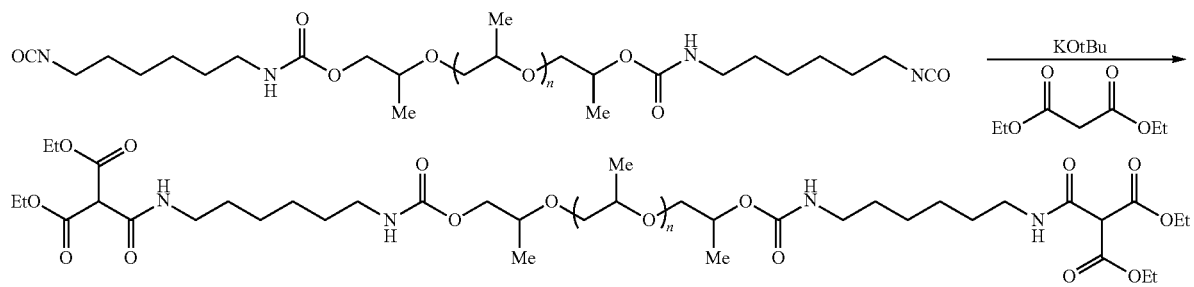

23.8 g (0.149 mol) diethyl malonate was dissolved in 450 ml THF. 16.7 g (0.149 mol) potassium tert. butoxide was added and the mixture was stirred for 30 minutes. Upon addition of the potassium tert. butoxide, the potassium salt of diethyl malonate precipitated from the medium. During the addition, the temperature rose to 40° C. The mixture was cooled to 20° C. and 50 g of HDI terminated poly(propylene oxide) (Desmodur XP2617, NCO-content: 12.5 w %) was added. The reaction was allowed to continue for 16 hours at room temperature. The solvent was removed under reduced pressure and 200 ml ethyl acetate and 300 ml methyl tert.butyl ether were added to the residue. The mixture was extracted with 400 ml of a solution of 14.9 g concentrated hydrochloric acid in a 25 w % sodium chloride solution. The organic fraction was isolated, extracted twice with 400 ml of a 25 w % sodium chloride solution and dried over MgSO$_4$. The solvent was removed under reduced pressure and the oligomeric blocked isocyanate ISO-13 was used for encapsulation without further purification.

The Synthesis of an IPDI Terminated Polypropylene Oxide Based Malonate Blocked Isocyanate (ISO-14)

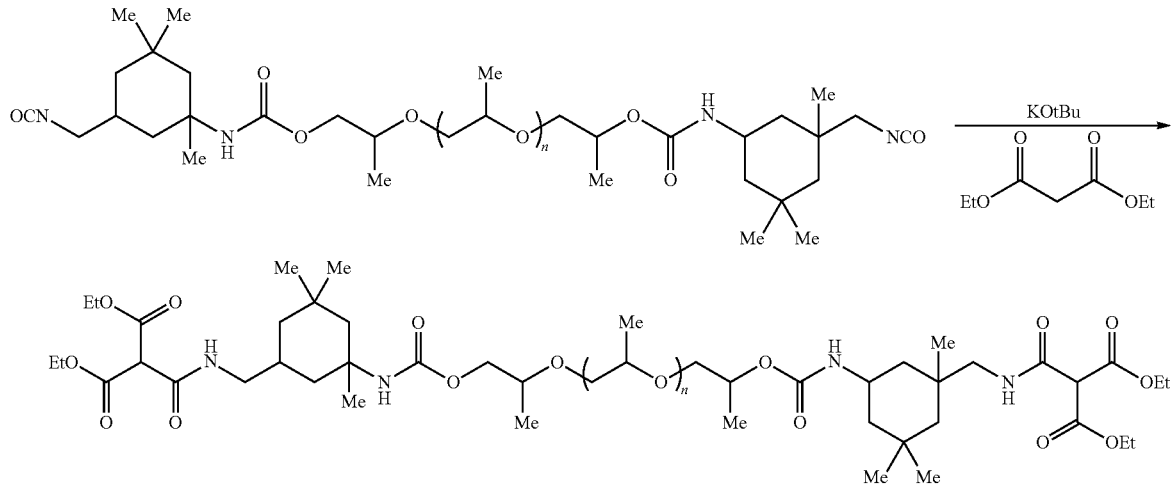

14.1 g (0.0881 mol) diethyl malonate was dissolved in 300 ml THF. 16.7 g (0.0881 mol) potassium tert. butoxide was added and the mixture was stirred for 30 minutes. Upon addition of the potassium tert. butoxide, the potassium salt of diethyl malonate precipitated from the medium. During the addition, the temperature rose to 40° C. The mixture was cooled to 20° C. and 100 g of IPDI terminated poly (propylene oxide) (Desmodur VPLS, NCO-content: 3.7 w %) was added. The reaction was allowed to continue for 16 hours at room temperature. The solvent was removed under reduced pressure and 300 ml methyl tert.butyl ether was added to the residue. The mixture was extracted with a solution of 8.8 g concentrated hydrochloric acid in 400 ml water. The organic fraction was isolated, extracted twice with 500 ml of a 25 w % sodium chloride solution and dried over MgSO$_4$. The solvent was removed under reduced pressure and the oligomeric blocked isocyanate ISO-14 was used for encapsulation without further purification.

The Synthesis of a TDI Terminated Ethylene Glycol Adipate Polyester Based Malonate Blocked Isocyanates (ISO-15, ISO-16)

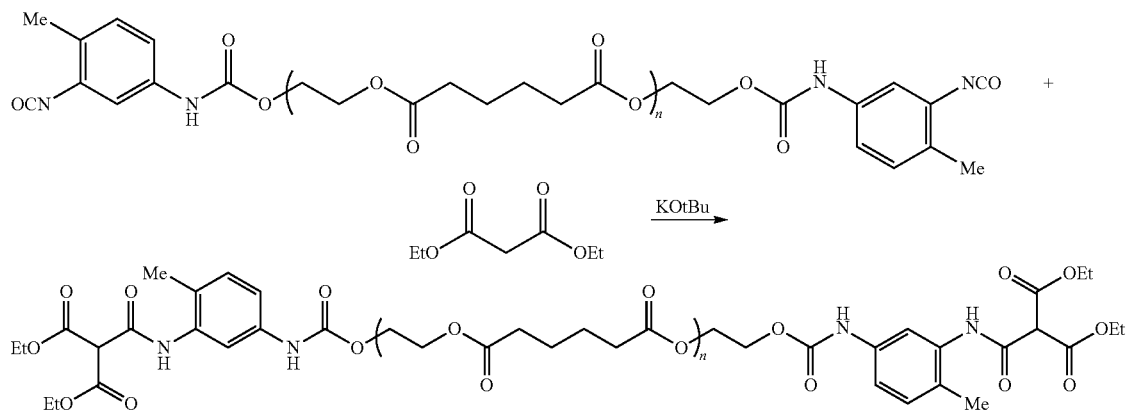

15.5 g (0.097 mol) diethyl malonate was dissolved in 400 ml THF. 10.9 g (0.097 mol) potassium tert. butoxide was added and the mixture was stirred for 30 minutes. Upon addition of the potassium tert. butoxide, the potassium salt of diethyl malonate precipitated from the medium. During the addition, the temperature rose to 40° C. The mixture was cooled to 20° C. and 100 g of Polurcast PET88 A 01, NCO-content: 3.9 w %) was added. The reaction was allowed to continue for 16 hours at room temperature. The solvent was removed under reduced pressure and 200 ml ethyl acetate and 300 ml methyl tert.butyl ether were added to the residue. The mixture was extracted with 400 ml of a solution of 14.9 g concentrated hydrochloric acid in a 25 w % sodium chloride solution. The organic fraction was isolated, extracted twice with 400 ml of a 25 w % sodium chloride solution and dried over MgSO$_4$. The solvent was removed under reduced pressure and the oligomeric blocked isocyanate ISO-15 was used for encapsulation without further purification.

ISO-16 was made the same way as ISO-15 but with 13.9 g (0.087 mol) diethyl malonate instead of 15.5 g. The NCO-content of the Polurcast PET85 was 3.5 wt. %.

The Synthesis of a TDI Terminated polyTHF Based Malonate Blocked Isocyanate (ISO-3):

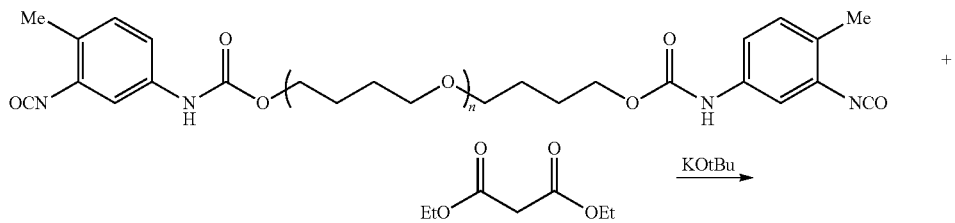

-continued

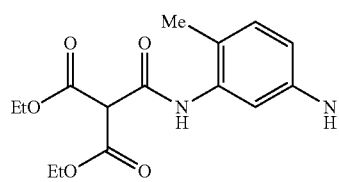 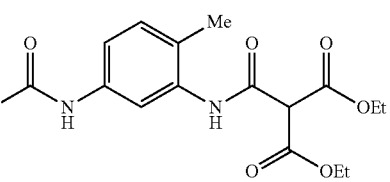

23.8 g (0.149 mol) diethyl malonate was dissolved in 450 ml THF. 16.7 g (0.149 mol) potassium tert. butoxide was added and the mixture was stirred for 30 minutes. Upon addition of the potassium tert. butoxide, the potassium salt of diethyl malonate precipitated from the medium. During the addition, the temperature rose to 40° C. The mixture was cooled to 20° C. and 100 g of Polurcast PE95 A 01, NCO-content: 6.0 w % was added. The reaction was allowed to continue for 16 hours at room temperature. The solvent was removed under reduced pressure and 200 ml ethyl acetate and 300 ml methyl tert.butyl ether were added to the residue. The mixture was extracted with 400 ml of a solution of 14.9 g concentrated hydrochloric acid in a 25 w % sodium chloride solution. The organic fraction was isolated, extracted twice with 400 ml of a 25 w % sodium chloride solution and dried over MgSO$_4$. The solvent was removed under reduced pressure and the oligomeric blocked isocyanate ISO-3 was used for encapsulation without further purification.

The Synthesis of Nanocapsules, the Core Containing Oligomeric Blocked Isocyanates, the Surrounding Shell Containing Anionic Dispersing Groups.

Nano-Anion-1

A solution of 22 g Desmodur N75 BA and 17 g of the oligomeric blocked isocyanate ISO-1 in 36.5 g ethyl acetate was prepared and this solution was added to a solution of 8 g Lakeland ACP 70, 2 g L-lysine and 0.9 g of a 33 w % solution of sodium hydroxide in 58 g water while stirring for 5 minutes using an Ultra-Turrax at a rotation speed of 18000 rpm. An additional 75 ml water was added to the emulsion and the ethyl acetate was evaporated at 65° C. under reduced pressure, while gradually increasing the vacuum from 500 mbar to 120 mbar. Upon complete evaporation of the ethyl acetate, an additional 60 ml water was evaporated. Water was added to adjust the weight of the dispersion to a total weight of 145 g. The dispersion was stirred for 16 hours at 65° C. The dispersion was allowed to cool down to room temperature and the dispersion was filtered over a 1.6 μm filter.

Nano-Anion-2

A solution of 22 g Desmodur N75 BA, 2 g Lakeland ACP 70 and 18 g of the oligomeric blocked isocyanate ISO-3 in 36.5 g ethyl acetate was prepared and this solution was added to a solution of 5.5 g Lakeland ACP 70, 2 g L-lysine and 2.5 g triethanol amine in 58 g water while stirring for 10 minutes using an Ultra-Turrax at a rotation speed of 18000 rpm. An additional 100 ml water was added to the emulsion and the ethyl acetate was evaporated at 65° C. under reduced pressure, while gradually increasing the vacuum from 500 mbar to 120 mbar. Upon complete evaporation of the ethyl acetate, an additional 55 ml water was evaporated. Water was added to adjust the weight of the dispersion to a total weight of 145 g. The dispersion was stirred for 16 hours at 65° C. The dispersion was allowed to cool down to room temperature and the dispersion was consecutively filtered over a 1.6 μm and a 1 μm filter.

Nano-Anion-3

Nano-anion-3 has been made the same way as Nano-anion-2 but with ISO-15 instead of ISO-3.

Nano-Anion-4

Nano-anion-4 has been made the same way as Nano-anion-2 but with ISO-16 instead of ISO-3.

The Synthesis of a Nanocapsule, the Core Containing Oligomeric Blocked Isocyanates, the Surrounding Shell Containing Cationic Dispersing Groups Nano-Cation-1

A solution of 22 g Desmodur BA and 22 g of the oligomeric blocked isocyanate ISO-1 in 36 g ethyl acetate was prepared and added to a solution of 6.5 g of the cationic surfactant CATSURF-2 and 30 g glycerol in 55 g water while stirring for 5 minutes using an Ultra-Turrax at a rotation speed of 18000 rpm. 80 g water was added and the ethyl acetate was evaporated at 65° C. under reduced pressure, while gradually increasing the vacuum from 500 mbar to 120 mbar. Upon complete evaporation of the ethyl acetate, an additional 60 ml water was evaporated. Water was added to the dispersion to bring the total weight to 145 g. The dispersion was stirred for 16 hours at 65° C. The dispersion was allowed to cool down to room temperature and consecutively filtered over a 5 μm and a 2.7 μm filter.

The average particle size was 190 nm.

Nano-Cation-2

A solution of 22 g Desmodur N75 BA and 18 g of the oligomeric blocked isocyanate ISO-14 in 36 g ethyl acetate was prepared and this solution was added to a solution of 6 g of the cationic surfactant CATSURF-1 in 45 ml water and 25 g glycerol while stirring for 5 minutes using an Ultra-Turrax at a rotation speed of 18000 rpm. 95 ml water was added to the dispersion and the ethyl acetate was evaporated at 65° C. under reduced pressure, while gradually increasing the vacuum from 500 mbar to 120 mbar. Upon complete evaporation of the ethyl acetate, an additional 60 ml water was evaporated. Water was added to adjust the weight of the dispersion to a total weight of 145 g. The dispersion was stirred for 16 hours at 65° C. The dispersion was allowed to cool down to room temperature. The dispersion was consecutively filtered over a 60 μm filter to remove a small fraction of precipitated polymer.

The average particle size was 200 nm.

Nano-Cation-3

Nano-cation was prepared the same way as Nano-cation-2 but with 18 g of the oligomeric blocked isocyanate ISO-13 instead of ISO-14.

The average particle size was 175 nm.

Example 1

The present example illustrates the increased ink shelf life stability when using encapsulated oligomeric blocked isocyanates according to the present invention.

The comparative ink COMP-1 and the inventive inks INV-1 to INV-4 were prepared by mixing the components according to Table 2. All weight percentages are based on the total weight of the ink jet ink.

TABLE 2

| Compounds (Wt. %) | INV-1 | INV-2 | INV-3 | INV-4 | COMP-1 |
|---|---|---|---|---|---|
| Diamond D75M | 25 | 25 | 25 | 25 | 25 |
| Glycerol | 17 | 17 | 17 | 17 | 17 |
| 1,2-propylene glycol | 17 | 17 | 17 | 17 | 17 |
| Alkanol XC | 0.25 | 0.25 | 0.25 | 0.25 | 0.25 |
| Triethanol amine | 1 | 1 | 1 | 1 | 1 |
| Nano-anion-1 | 39.75 | — | — | — | — |
| Nano-anion-2 | — | 39.75 | — | — | — |
| Nano-anion-3 | — | — | 39.75 | — | — |
| Nano-anion-4 | — | — | — | 39.75 | — |
| Comp-anion-1 | — | — | — | — | 39.75 |

The Synthesis of the Comparative Nanocapsule Comp-Anion-1:

A solution of 22 g Desmodur N75 BA and 23 g Trixene BI7963 in 36.5 g ethyl acetate was prepared. This solution was added to a solution of 8 g Lakeland ACP70, 2 g L-lysine and 1 g of a 33 w % solution of sodium hydroxide in 75 g water while stirring for 5 minutes using an Ultra-Turrax at a rotation speed of 18000 rpm. The ethyl acetate was evaporated at 65° C. under reduced pressure, while gradually increasing the vacuum from 500 mbar to 120 mbar. Upon complete evaporation of the ethyl acetate, an additional 60 ml water was evaporated. Water was added to the dispersion to bring it to a total weight of 145 g. The dispersion was stirred for 16 hours at 65° C. The dispersion was allowed to cool down to room temperature. The dispersion was filtered over a 1 µm filter.

The average particle size was 180 nm.

The results of the stability measurements on the inventive inks INV-1 to INV-4 and the comparative ink COMP-1 are summarized in Table 3

TABLE 3

| Ink | Stability measurement |
|---|---|
| INV-1 | No increase in viscosity |
| INV-2 | No increase in viscosity |
| INV-3 | No increase in viscosity |
| INV-4 | No increase in viscosity |
| COMP-1 | Complete solidification after two days |

From Table 3, it becomes apparent that the encapsulated oligomeric blocked isocyanates according to the present invention give a dramatic increase in shelf life stability compared to standard blocked isocyanates.

Example 2

This example illustrates the wide range of compatibility of encapsulated oligomeric blocked isocyanates with different pigment dispersions.

The inventive inks INV-5 to INV-14 were prepared by mixing the components according to Table 4. All weight percentages are based on the total weight of the ink jet ink.

The inventive inks INV-5 to INV-14 were artificially aged at 60° C. The change in viscosity was monitored in function of time. All inks proved to have a shelf life of more than 7 days at 60° C., illustrating that the encapsulated oligomeric blocked isocyanates are compatible with a broad scope of pigment dispersion.

TABLE 4

| W % of | INV-5 | INV-6 | INV-7 | INV-8 | INV-9 | INV-10 | INV-11 | INV-12 | INV-13 | INV-14 |
|---|---|---|---|---|---|---|---|---|---|---|
| Nano-anion-1 | 39.75 | 39.75 | 39.75 | 39.75 | 39.75 | 39.75 | 39.75 | 39.75 | 39.75 | 39.75 |
| Glycerol | 17 | 17 | 17 | 17 | 17 | 17 | 17 | 17 | 17 | 17 |
| 1,2-propane diol | 17 | 17 | 17 | 17 | 17 | 17 | 17 | 17 | 17 | 17 |
| Alkanol XC | 0.25 | 0.25 | 0.25 | 0.25 | 0.25 | 0.25 | 0.25 | 0.25 | 0.25 | 0.25 |
| Triethanol amine | 1 | 1 | 1 | 1 | 1 | 1 | 1 | 1 | 1 | 1 |
| Cab-O-Jet 450C | 25 | — | — | — | — | — | — | — | — | — |
| Cab-O-Jet 465M | — | 25 | — | — | — | — | — | — | — | — |
| Cab-O-Jet 470Y | — | — | 25 | — | — | — | — | — | — | — |
| Cab-O-Jet 300 | — | — | — | 25 | — | — | — | — | — | — |
| Cab-O-Jet 740Y | — | — | — | — | 25 | — | — | — | — | — |
| Diamond D75C | — | — | — | — | — | 25 | — | — | — | — |
| Diamond D75M | — | — | — | — | — | — | 25 | — | — | — |
| Diamond D75Y | — | — | — | — | — | — | — | 25 | — | — |
| Diamond D75K | — | — | — | — | — | — | — | — | 25 | — |
| Diamond D71Y155 | — | — | — | — | — | — | — | — | — | 25 |

Example 3

This example illustrates the capability of adjusting the touch and the feel of a printed fabric by using encapsulated oligomeric blocked isocyanates compared to standard blocked isocyanates.

The anionic ink INV-15 and comparative ink COMP-2 were prepared by mixing the components according to Table 5. All weight percentages are based on the total weight of the ink jet ink.

TABLE 5

| Wt. % of component | INV-15 | COMP-2 |
|---|---|---|
| Nano-anion-1 | 37.75 | — |
| Comp-anion-1 | — | 37.75 |
| Cab-o-Jet 465M | 23.5 | 23.5 |
| Alkanol XC | 0.25 | 0.25 |
| Triethyl amine | 0.5 | 0.5 |
| Glycerol | 19 | 19 |
| 1,2-propane diol | 19 | 19 |

The mixtures were stirred for 5 minutes and filtered over a 5 µm filter.

Solid areas of the inventive ink INV-15 and the comparative ink COMP-2 were printed on an untreated cotton textile, using a Dimatix™ DMP2831 system, equipped with a standard Dimatix™ 10 µl print head. The ink was jetted at 22° C., using a firing frequency of 5 kHz, a firing voltage of 25 V and a standard waveform. The inventive and comparative sample were dried, followed by thermal fixation at 160° C. for 5 minutes.

A touch and feel test was done. The inventive ink was scored 1 on average while the comparative ink was scored 3 on average, illustrating the clearly improved touch and feel by using the oligomeric approach.

Example 4

This example illustrates the capability of adjusting the touch and the feel of a printed fabric by treating a cotton fabric with a jettable pre-treatment liquid comprising a dispersion of encapsulated oligomeric blocked isocyanates. The Pre-Treatment Liquid INKCAT-1:

The pre-treatment liquid INKCAT-1 was prepared by mixing the components according to Table 6. All weight percentages are based on the total weight of the liquid.

TABLE 6

| Wt. % of component | INKCAT-1 |
|---|---|
| Nano-cationic-1 | 36.3 |
| 1,2-propane diol | 20.4 |
| glycerol | 20.4 |
| water | 22.9 |

Comparative and Inventive Samples

An inventive sample was printed as follows. A solid area was printed onto an untreated cotton fabric with the pre-treatment liquid INKCAT-1, using the same inkjet system as in Example 3. Onto the printed solid area the comparative ink COMP-2 was jetted with the same inkjet system as in Example 3. The inventive sample was dried followed by thermal fixation at 160° C. for 5 minutes.

A comparative sample was printed as follows. A solid area was printed onto untreated cotton fabric with comparative ink COMP-2, using the same inkjet system as in Example 3. The comparative sample was dried, followed by thermal fixation at 160° C. for 5 minutes.

A touch and feel test was done. The fabric, pre-treated with the pre-treatment liquid comprising the dispersion of encapsulated oligomeric blocked isocyanates was scored 1.5 on average while the fabric without the pre-treatment was scored 3.5 on average, illustrating the clearly improved touch and feel by using the oligomeric approach in the pre-treatment of fabrics.

The invention claimed is:

1. An aqueous dispersion comprising:
a capsule including a polymeric shell surrounding a core; wherein
the core includes an oligomeric blocked isocyanate; and
the oligomeric blocked isocyanate is derived from a di-, tri- or tetra-functional isocyanate terminated oligomer selected from the group consisting of an isocyanate terminated oligo-ether, an isocyanate terminated oligo-ester, an isocyanate terminated oligo-carbonate, an isocyanate terminated butadiene oligomer, an isocyanate terminated hydrogenated butadiene, an isocyanate terminated isoprene oligomer, an isocyanate terminated silicone, and combinations thereof.

2. The aqueous dispersion according to claim 1, wherein the oligomeric blocked isocyanate has a structure according to General Structure I:

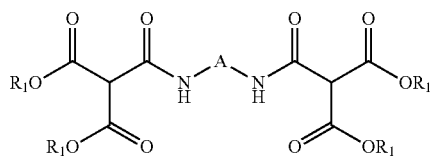

General Structure I wherein
R1 is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group; and
A represents a difunctional oligomeric group selected from the group consisting of an oligo-ether, an oligo-ester, an oligo-carbonate, a butadiene oligomer, a hydrogenated butadiene oligomer, an isoprene oligomer, a silicone oligomer, and combinations thereof.

3. The aqueous dispersion according to claim 2, wherein $R_1$ represents a C1 to C4 alkyl group.

4. The aqueous dispersion according to claim 1, further comprising a dispersing group covalently bonded to the polymeric shell.

5. The aqueous dispersion according to claim 4, wherein the dispersing group is selected from the group consisting of a carboxylic acid or salt thereof, a sulfonic acid or salt thereof, a phosphoric acid ester or a salt thereof, and a phosphonic acid or salt thereof.

6. An aqueous inkjet ink comprising:
a pigment; and
the aqueous dispersion as defined in claim 5.

7. The aqueous dispersion according to claim 4, wherein the dispersing group is selected from the group consisting of a protonated amine, a protonated nitrogen containing heteroaromatic compound, a quaternized tertiary amine, a N-quaternized heteroaromatic compound, a sulfonium, and a phosphonium.

8. The aqueous dispersion according to claim 7, further comprising a surfactant represented by Formula I covalently bonded to the polymeric shell of the capsule:

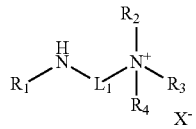

Formula I wherein
$R_1$ is selected from the group consisting of a substituted or unsubstituted alkyl group, a substituted or unsubstituted alkenyl group, and a substituted or unsubstituted alkynyl group, and $R_1$ includes at least eight carbon atoms;
$R_2$, $R_3$, and $R_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted (hetero)aryl group;

L₁ represents a divalent linking group including no more than eight carbon atoms;

X represents a counterion that compensates for a positive charge of the ammonium group in Formula I.

9. An aqueous pre-treatment liquid for textile printing, the aqueous pre-treatment liquid comprising:
the aqueous dispersion as defined in claim 8.

10. A fluid set for textile printing, the fluid set comprising:
the aqueous pre-treatment liquid as defined in claim 9; and
an aqueous inkjet ink including a pigment and a capsule including a polymeric shell surrounding a core; wherein
the core includes an oligomeric blocked isocyanate; and
the oligomeric blocked isocyanate is derived from a di-, tri- or tetra-functional isocyanate terminated oligomer selected from the group consisting of an isocyanate terminated oligo-ether, an isocyanate terminated oligo-ester, an isocyanate terminated oligo-carbonate, an isocyanate terminated butadiene oligomer, an isocyanate terminated hydrogenated butadiene, an isocyanate terminated isoprene oligomer, an isocyanate terminated silicone, and combinations thereof.

11. An aqueous pre-treatment liquid for textile printing, the aqueous pre-treatment liquid comprising:
the aqueous dispersion as defined in claim 7.

12. A fluid set for textile printing, the fluid set comprising:
the aqueous pre-treatment liquid as defined in claim 11; and
an aqueous inkjet ink including a pigment and a capsule including a polymeric shell surrounding a core; wherein
the core includes an oligomeric blocked isocyanate; and
the oligomeric blocked isocyanate is derived from a di-, tri- or tetra-functional isocyanate terminated oligomer selected from the group consisting of an isocyanate terminated oligo-ether, an isocyanate terminated oligo-ester, an isocyanate terminated oligo-carbonate, an isocyanate terminated butadiene oligomer, an isocyanate terminated hydrogenated butadiene, an isocyanate terminated isoprene oligomer, an isocyanate terminated silicone, and combinations thereof.

13. An aqueous inkjet ink comprising:
a pigment; and
the aqueous dispersion as defined in claim 4.

14. A fluid set for textile printing, the fluid set comprising:
an aqueous pre-treatment liquid including a flocculant; and
the aqueous inkjet ink as defined in claim 13.

15. An aqueous inkjet ink comprising:
a pigment; and
the aqueous dispersion as defined in claim 1.

16. The aqueous inkjet ink according to claim 15, further comprising a water-soluble organic solvent.

17. A fluid set for textile printing, the fluid set comprising:
an aqueous pre-treatment liquid including a flocculant; and
the aqueous inkjet ink as defined in claim 15.

18. An inkjet printing method comprising the steps of:
jetting an inkjet ink as defined in claim 15 onto a substrate; and
applying heat to activate the oligomeric blocked isocyanate in the capsule.

19. The inkjet printing method according to claim 18, further comprising:
prior to the step of jetting, applying an aqueous pre-treatment liquid to the substrate; wherein
the aqueous pre-treatment liquid includes:
a capsule including a polymeric shell surrounding a core, the core including an oligomeric blocked isocyanate derived from a di-, tri- or tetra-functional isocyanate terminated oligomer selected from the group consisting of an isocyanate terminated oligo-ether, an isocyanate terminated oligo-ester, an isocyanate terminated oligo-carbonate, an isocyanate terminated butadiene oligomer, an isocyanate terminated hydrogenated butadiene, an isocyanate terminated isoprene oligomer, an isocyanate terminated silicone, and combinations thereof; and
a dispersing group covalently bonded to the polymeric shell, and the dispersing group is selected from the group consisting of a protonated amine, a protonated nitrogen containing heteroaromatic compound, a quaternized tertiary amine, a N-quaternized heteroaromatic compound, a sulfonium, and a phosphonium; and
the substrate includes a textile fabric.

20. The inkjet printing method according to claim 18, wherein the step of applying the aqueous pre-treatment liquid includes jetting the aqueous pre-treatment liquid.

* * * * *